United States Patent [19]

Beatty et al.

[11] 3,871,921

[45] Mar. 18, 1975

[54] FLAT ALKALINE CELL CONSTRUCTION AND METHOD FOR ASSEMBLING THE SAME

[75] Inventors: Theodore R. Beatty, Bay Village; Harry Vourlis, Lakewood, both of Ohio

[73] Assignee: Union Carbide Corporation, New York, N.Y.

[22] Filed: Apr. 1, 1974

[21] Appl. No.: 456,838

[52] U.S. Cl. ................................ 136/111, 136/176

[51] Int. Cl. ........................................ H01m 21/00

[58] Field of Search ............ 136/111, 135, 175, 176

[56] References Cited

UNITED STATES PATENTS

| | | | |
|---|---|---|---|
| 2,848,526 | 8/1958 | Franquemont | 136/111 |
| 3,634,142 | 1/1972 | Eaton | 136/111 |
| 3,674,565 | 7/1972 | Bergum et al. | 136/111 |

*Primary Examiner*—John H. Mack
*Assistant Examiner*—C. F. LeFevour
*Attorney, Agent, or Firm*—John R. Doherty

[57] ABSTRACT

A flat alkaline cell is described which comprises an electrode assembly including at least a pair of flat electrode elements of opposite polarity and a porous separator containing the alkaline electrolyte interposed between and in contact with the pair of electrode elements, wherein the electrode assembly is enclosed within a sealed, liquidimpervious plastic film envelope having an opening in one wall thereof and wherein flat internal and external current collectors are disposed adjacent to the inner and outer sides of the wall, respectively, overlying the opening, the collectors being tightly adhered to the respective sides of the wall by thin layers of an adhesive sealant which is non-wettable by the alkaline electrolyte. Means are provided for making electrical connection between the current collectors through the opening in the wall. Also disclosed is a method for assembling the flat cell wherein a composite collector-wall member is formed prior to completion of the sealed envelope.

29 Claims, 5 Drawing Figures

FLAT ALKALINE CELL CONSTRUCTION AND METHOD FOR ASSEMBLING THE SAME

BACKGROUND OF THE INVENTION

This invention relates to flat, electric currentproducing cells using an alkaline electrolyte and to certain improvements in a flat alkaline cell construction of the type wherein the active cell elements are enclosed within a sealed envelope made of a liquid impervious plastic film.

More particularly, the invention relates to a flat alkaline cell construction of the type disclosed and claimed in our copending application Ser. No. 456,837, filed on Apr. 1, 1974. Such a flat cell comprises an electrode assembly including at least a pair of flat electrode elements of opposite polarity, a porous separator containing the alkaline electrolyte, suitably an aqueous potassium hydroxide solution, interposed between and in contact with the pair of electrode elements, and a current collector which may be a thin flat metal plate or foil, disposed adjacent to and in electrical connection with one of the pair of electrode elements at one end of the electrode assembly. All of the cell elements are enclosed within a sealed envelope made of a liquid impervious plastic film. The sealed envelope is formed with an opening adjacent to the current collector which exposes the collector for making external electrical connection, for example, between adjacent cells in a stack of flat cells forming a battery. A layer of adhesive sealant which is chemically resistant to and non-wettable by the alkaline electrolyte, preferably chosen from a class of compounds known as "fatty polyamides," surrounds the periphery of the opening and seals the interface between the current collector and the plastic film forming the sealed envelope. An outstanding advantage of this flat cell construction is that the adhesive sealant which is non-wettable by the alkaline electrolyte, resists creepage of the electrolyte past the sealant and out through the opening in the sealed envelope. In prior flat cell constructions of this kind, such as disclosed in Tamminen, U.S. Pat. No. 3,708,340, a sticky and water repellent sealant material, such as soft microcrystalline wax, has been used to seal the opening in the plastic film envelope. However, this sealant material is wettable by the alkaline electrolyte and leakage can occur through creepage of the electrolyte past the sealant.

In the preferred flat cell construction disclosed and claimed in our copending application, supra, the layer of adhesive sealant is applied to substantially the entire face of the current collector, except for a small area coinciding with the opening in the plastic film envelope, tightly sealing the interface between the collector and the plastic film and also extending substantially the leakage path and increasing the resistance to creepage of the alkaline electrolyte from its location inside the cell.

It is an important object of this invention to provide a flat alkaline cell construction of the type described in which the extended leakage path for resisting creepage of the alkaline electrolyte is further increased.

Another object of this invention is to provide an improved method for assembling a flat alkaline cell construction of the type described which is fast and economical.

SUMMARY OF THE INVENTION

This invention resides in a flat alkaline cell construction comprising an electrode stack assembly including at least a pair of flat electrode elements of opposite polarity and a porous separator containing the alkaline electrolyte, interposed between and in contact with the pair of electrode elements, the electrode stack assembly being enclosed within a sealed envelope made of a liquid impervious plastic film and preferably a plastic film which is electrically non-conductive. The sealed envelope is formed with an opening in one wall thereof and both internal and external current collectors which may be flat thin metal plates or foils, are disposed adjacent to each side of the wall and overlapping the opening, the internal current collector being also disposed adjacent to one end of the electrode stack assembly and being in electrical connection with one of the pair of electrode elements. A layer of adhesive sealant which is non-wettable by the alkaline electrolyte, preferably a fatty polyamide sealant, is interposed between the internal current collector and the inner surface of the wall of the sealed envelope, and another layer of the adhesive sealant is interposed between the external current collector and the outer surface of the wall. Both layers of adhesive sealant preferably cover substantially the entire face of both current collectors, except for a small area coinciding with the opening in the wall of the sealed envelope. Suitable means such as a spot weld are provided for making electrical connection between the internal and external current collectors through the opening in the wall. With this construction, both layers of the adhesive sealant tightly seal the interfaces between the current collectors and each side of the wall of the sealed envelope and also extend the leakage path which traverses approximately the total width or length of one of the collectors.

In the preferred embodiment of the flat alkaline cell construction, the sealed envelope is composed of essentially two parts, that is, a plastic film cupped container in which the electrode stack assembly is placed and a cover, both the cover and cupped container being sealed tightly together along their marginal borders such as by heat sealing. Both the cover and the bottom wall of the cupped container are provided with sealed internal and external current collectors in the same manner as described hereinabove for making external electrical connection, for example, between adjacent cells in a stack of flat cells forming a battery.

The invention further resides in a method of assembling a flat alkaline cell construction of the type described comprising the steps of providing at least two plastic film wall members for forming a sealed envelope, at least one of said plastic film wall members having an opening therein, positioning a flat thin internal and a flat thin external collector plate or foil adjacent to the inner and outer sides of said plastic film wall member, respectively, overlapping the opening in said wall member, applying a layer of adhesive sealant which is non-wettable by the alkaline electrolyte, preferably a fatty polyamide sealant, on the surface of at least one of the internal and external collector plates or foils and said plastic film wall member, tightly adhering the internal and external collector plates or foils to the respective inner and outer sides of said wall member by means of the layer of adhesive sealant, electrically connecting both the internal and external collector plates or foils through the opening in said wall member, placing the so formed composite envelope wall-collector member adjacent to one end of an electrode stack assembly and electrically connecting the internal collector plate or foil with one of the electrodes in the stack, and then completing the assembly of the sealed envelope by placing the other plastic film wall member adjacent to the opposite end of the electrode stack assembly and tightly sealing the marginal borders of both wall members together such as by heat sealing.

In the method of assembling the preferred flat cell construction, both internal and external collector plates or foils are tightly adhered to the inner and outer sides of the cupped container and cover, respectively, by means of the layers of adhesive sealant to form a composite container-collector member and a composite cover-collector member, both in the manner as described hereinabove, the electrode stack assembly is placed inside of the cupped container with the internal collector plate or foil making electrical connection with one electrode at one end of the stack, the cover is placed over the open end of the cupped container with its internal collector making electrical connection with another electrode at the opposite end of the stack, and the sealed envelope is then completed by tightly sealing the marginal borders of both the cupped container and cover such as by heat sealing.

Although the invention is widely applicable to flat alkaline cell constructions in general, it will be more fully described hereinafter with particular reference to a rechargeable nickel-cadmium cell. It will be understood, of course, that the flat alkaline cell construction of the invention may utilize other electrode systems such as the zinc/manganese dioxide system as will readily occur to those skilled in the art.

DESCRIPTION OF THE PREFERRED EMBODIMENTS

Figure 1:
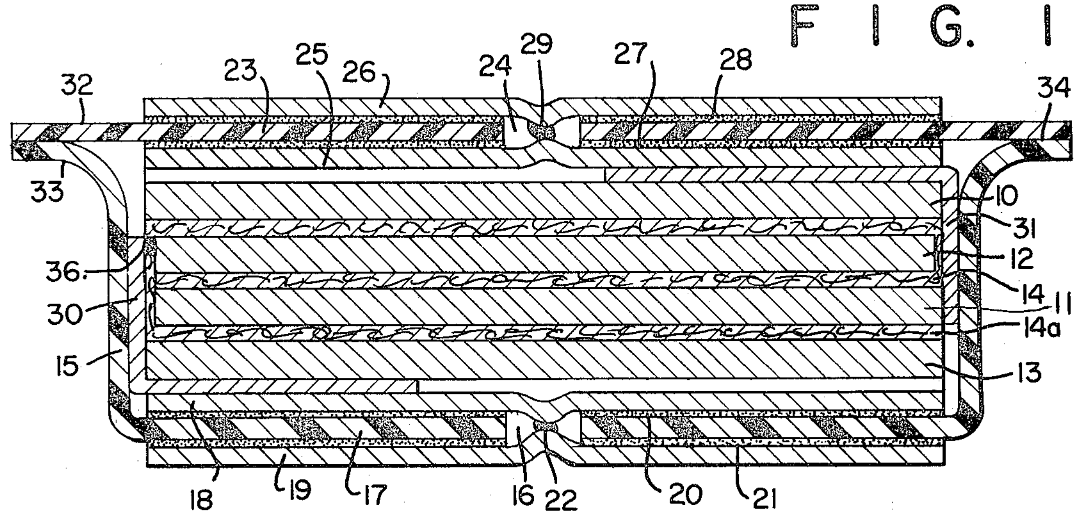
FIG. 1 is an elevational view in cross-section of a flat alkaline cell construction in accordance with the invention.

FIG. 1 illustrates a rechargeable flat nickelcadmium cell made in accordance with the invention. The cell comprises an electrode assembly including a pair of flat thin positive electrode plates 10, 11 and a pair of flat thin negative electrode plates 12, 13 which are arranged in alternate fashion with the positive electrode plate 10 being located at one end of the electrode stack, the negative electrode plate 12 placed between the pair of positive electrode plates 10, 11 and with the negative electrode plate 13 being located at the opposite end of the electrode stack. A porous separator, soaked with the alkaline electrolyte, is sandwiched between and in contact with the pairs of electrode plates of opposite polarity in the stack, that is, between the positive electrode plate 10 and negative electrode plate 12, and between the positive electrode plate 11 and each of the negative electrode plates 12, 13. Preferably, the porous separator is in the form of a continuous strip 14 of the separator material which is wound completely around the negative electrode plate 12 and then interposed between the positive electrode plate 11 and the negative electrode plate 13 as best shown in the assembly view of FIG. 4. All of the electrode plates 10, 11, 12 and 13 are rectangular in shape and are of substantially the same size such that the electrode plates are congruent with one another in the electrode stack assembly.

The positive electrode plates 10, 11 contain an electrochemically oxidizable active material such as nickelhydroxide while the negative electrode plates 12, 13 contain an electrochemically reducible active material such as cadmium oxide or cadmium hydroxide. In accordance with the conventional practice in the art, the negative electrode plates 12, 13 contain additional active material in order to provide an overcharge reserve which will prohibit the harmful generation of hydrogen gas on overcharge of the cell. Similarly, the positive electrode plates 10, 11 may contain some negative active material as antipolar mass in order to provide an overdischarge reserve which will substantially delay harmful generation of hydrogen gas on overdischarge of the cell. Both the positive electrode plates 10, 11 and negative electrode plates 12, 13 may be sintered type electrodes fabricated from a sintered metal plaque which may be made, for example, by sintering a layer of metal powder, e.g. nickel powder, onto both sides of an open, porous substrate such as a nickel screen, which serves as a mechanical support. The sintered metal plaque is impregnated with the electrochemically active material in accordance with methods well known in the art. The separator strip 14 containing alkaline electrolyte, may be made from a conventional separator material such as a nonwoven organic fiber matte. A preferred type is made from nylon fiber under the tradename "Pellon." Suitably, the alkaline electrolyte used in the cell is a 30 percent by weight solution of potassium hydroxide.

Figure 2:
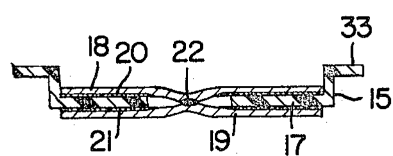
FIG. 2 is a cross-sectional view of the composite cupped container-collector used in the flat cell of FIG. 1.

A shallow cupped container 15 is provided for the cell and is preferably made by vacuum forming the cup from a sheet of liquid impervious, electrically nonconductive plastic film, such as a polypropylene film. The cupped container 15 is formed with an opening 16 in the bottom wall 17 thereof. Both internal and external current collectors 18, 19 in the form of flat, thin metal plates or foils, suitably a nickel foil, for example, are placed adjacent to the inner and outer sides of the container bottom wall 17, respectively, overlying the opening 16. These foil collectors 18, 19 are tightly adhered to the inner and outer sides of the bottom wall 17 by thin layers 20, 21, respectively, of an adhesive sealant which is chemically resistant to and nonwettable by the alkaline electrolyte. Preferably, the layers 20, 21 of adhesive sealant cover substantially the entire surface of the foil collectors 18, 19, tightly sealing the interfaces between the collectors 18, 19 and the bottom wall 17 of the cupped container 15. Both of the foil collectors 18, 19 are electrically connected to one another such as by means of the spot weld 22 or a solder spot. Alternatively, the foil collectors 18, 19 may be electrically connected to one another by other means such as the use of an electrically conductive cement. The plastic film cupped container 15 and both foil collectors 18, 19 are first assembled in accordance with the practice of the invention as a composite member which is best illustrated in the view of FIG. 2.

Figure 3:
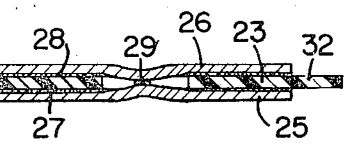
FIG. 3 is a cross-sectional view of the composite cover-collector also used in the flat cell of FIG. 1.

A cover 23 preferably made from the same liquid impervious, electrically non-conductive plastic film, is provided for the cupped container 15 and is also formed with an opening 24 in the middle thereof. Both internal and external current collectors 25, 26 also in the form of flat, thin metal plates or foils, are placed adjacent to the inner and outer sides of the cover 23, overlying the opening 24. These foil collectors 25, 26 are tightly adhered to the inner and outer sides of the cover 23 by thin layers 27, 28, respectively, of the same adhesive sealant. Preferably, the layers 27, 28 of adhesive sealant cover substantially the entire face of the foil collectors 25, 26 tightly sealing the interfaces between the collectors and the cover 23. Both of the foil collectors 25, 26 are electrically connected to one another also by means of the spot weld 29. The plastic film cover 23 and the foil collectors 25, 26 are also first assembled in accordance with the practice of the invention as a composite member which is best illustrated in the view of FIG. 3.

The pair of negative electrode plates 12, 13 are electrically interconnected by means of a thin metal collector tab 30 which is secured at one end to the corresponding peripheral edges of both negative electrode plates 12, 13 such as by welding. At its other end the tab 30 is interposed between and in contact with the negative electrode plate 13 and the internal current collector 18 at one end of the electrode stack assembly. Similarly, the pair of positive electrode plates 10, 11 are electrically interconnected by means of a thin metal tab 31 which is secured at one end to the corresponding peripheral edges of both positive electrode plates 10, 11. At its other end the tab 31 is interposed between the positive electrode plate 10 and the internal current collector 28 at the other end of the electrode stack assembly. Tabs 30, 31 are secured such as by welding to the respective collectors 18, 28 during the assembly of the cell as will be described in greater detail hereinafter.

Both the cupped container 15 and the cover 26 which are preferably made from the same liquid impervious, electrically non-conductive plastic film, are formed with marginal borders 32, 33, respectively, which are secured together such as by heat sealing to provide a tight, leakage proof seam 34.

Figure 4:
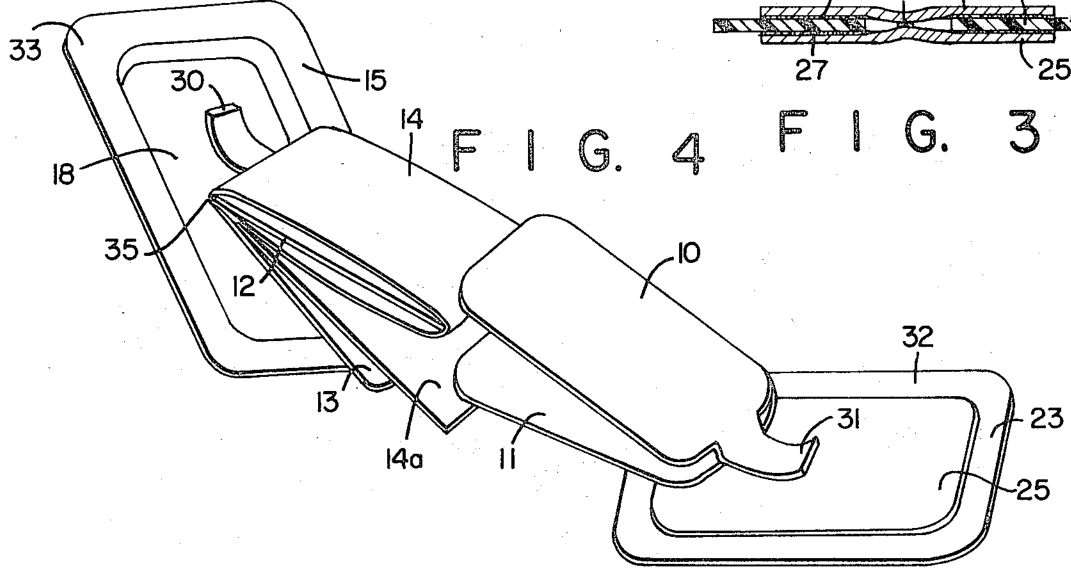
FIG. 4 is an exploded view of the cell components illustrating the method of assembling the flat cell of FIG. 1.
Figure 5:
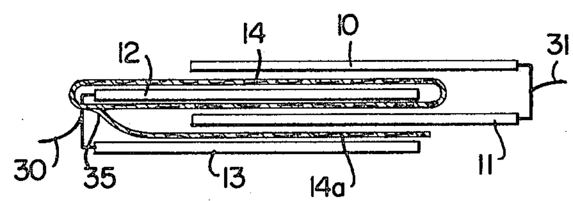
FIG. 5 is a diagrammatical view of the electrode stack assembly used in the flat cell of FIG. 1.

The method of assembling the flat cell construction is best represented in the views of FIGS. 4 and 5. As already indicated, the cupped container 15 is first formed as a composite member with both the internal and external current collector foils 18, 19 tightly adhered to the inner and outer sides of the container bottom wall 17 through means of the thin layers 20, 21 of adhesive sealant. Similarly, the cover 23 is first formed as a composite member with both the internal and external collector foils 25, 26 tightly secured to the inner and outer sides of the cover through means of the thin layers 20, 21 of adhesive sealant. Tab 30 is secured such as by welding to the corresponding peripheral edges of the pair of negative electrode plates 12, 13 while the tab 31 is secured in like fashion to the corresponding peripheral edges of the pair of positive electrode plates 10, 11. The continuous strip 14 of the separator material, which is approximately three times the length of an electrode plate, is wound completely around the negative electrode plate 12 with one end being secured to the portion of the strip 14 which overlaps the peripheral edge of the negative electrode plate 12 suitably by a heat seal as shown at 35 in FIG. 5. Provision is made for passage of the tab 30 through the strip 14 such as by means of a slot 36 (FIG. 1). The free portion 14*a* of the strip 14 which extends beyond the seal 35 is interleaved between the pair of negative electrode plates 12, 13. Tab 30 is then secured as by welding to the internal collector foil 18 within the bottom of the cupped container 15 while in a similar manner tab 31 is secured as by welding to the internal collector foil 25 on the cover 23. The pair of positive electrode plates 10, 11 are then interleaved with the pair of negative electrode plates 12, 13 with the negative electrode plate 12, which is enveloped by the separator sheet or web 14, interposed between the pair of positive electrode plates 10, 11 to complete the electrode stack assembly. With all of the cell components placed in the manner as herein above described, the cover 23 is placed over the open end of the cupped container 15 and their marginal borders 32, 33 are secured together such as by heat sealing to complete the assembly of the cell.

Although not illustrated in the accompanying drawing, it will be evident that a number of flat alkaline cells constructed in accordance with the invention can be easily stacked together, for example, in columnar form, to constitute a battery of higher output voltage. In constructing a series-connected battery, the flat cells are stacked one on top of another with the negative collector foil 19 of one cell making pressure contact with the positive collector foil 26 of the next cell. Other arrangements are of course possible, such as a parallel or a series-parallel connected battery as will readily occur to those skilled in the art. Such arrangements may utilize, for example, intercell connections made by metal wires or strips which are welded or soldered to the external collectors of the cells.

When constructing a battery of flat cells in the manner as described above, it is the usual practice to place the stack of cells within a closely fitting outer housing or container made of metal or a rigid plastic, for example. Flat cells of the invention are well adapted to the assembly of batteries of this construction, it being noted that the marginal borders of both the cupped container 15 and cover 23 which are heat sealed together to provide the leakproof seam 34, actually constitute a flexible flange member which surrounds each individual cell and which may easily be bent downward along the side wall of each cell when the stack of cells are placed inside the metal or plastic outer container. There is essentially no wasted space because of the leakproof seam 34 and the high energy density capabilities of the flat cell of the invention can be fully realized.

In flat cells of the invention utilizing the rechargeable nickel-cadmium electrode system as in other cell configurations such as cylindrical and rectangular cells, gas generation and the consequent build up of substantial gas pressure inside the cell can occur particularly if the cell is placed on overcharge for long periods of time. On overcharge, oxygen gas may be liberated at the positive electrode at a faster rate than it can be recombined at the negative electrode leading to a build up of high internal gas pressure. In addition, excessive oxygen gas pressures can lead to nearly complete charging of the negative electrode which results in the generation of hydrogen gas from the negative electrode. The evolution of hydrogen gas further increases the gas pressure inside the cell since it does not recombine within the cell as does the oxygen.

In flat cells of this invention the plastic film envelope which is made, for example, of a polypropylene or vinyl film is flexible and fairly weak. The cell can rupture although without danger if the internal gas pressure is allowed to build up to any significant level such as 160 psi, for example. In order to avoid this problem, it has been found desirable to provide a mechanism for preventing the generation of hydrogen at the negative electrode while at the same time facilitating the recombination of oxygen. Accordingly, in the preferred embodiment of a rechargeable nickel-cadmium flat cell, the positive and negative electrodes are balanced electrochemically with respect to one another such that the capacity of the negative electrode is greater than that of the positive electrode. Preferably, the capacity of the negative electrode is at least one and one-half times greater than that of the positive electrode and may be as great as three times the positive capacity.

Commercial plastic films which may be employed in the practice of this invention include those made of the following materials: vinyl polymers and copolymers, polyvinylidene chloride, polyethylene, polypropylene, nylon, polysulfone, polystyrene, and fluorocarbon polymers. For use with the preferred fatty polyamide adhesive, films made of polyethylene, polypropylene, and vinyl polymers and copolymers are preferred. Regular and shrink-type films are available in these materials. Desired film characteristics include the following: low cost, flexibility, tear and puncture resistance, chemical stability and resistance to alkaline battery electrolyte, hot-formability, low oxygen gas and water vapor transmission rates, and of course strong surface adherence with fatty polyamide or equivalent adhesive. To reduce the gas and water vapor transmission rate of the plastic film, it may be vacuum metallized or otherwise given a surface metallic coating on one or both sides providing of course the film is not made electrically conductive enough to put a parasitic current drain on the cell.

Although there are probably a number of organic compounds which exhibit a non-wetting characteristic when in contact with an alkaline electrolyte, the most preferred adhesive sealant for use in the practice of the invention are the fatty polyamides. Such fatty polyamide sealants are disclosed in application Ser. No. 392,222 of J. Winger filed on Aug. 28, 1973, which is a continuation of application Ser. No. 167,678, filed on July 30, 1971 now abandoned, and assigned to the common assignee hereof. As disclosed in the copending application, fatty polyamides are produced by reacting a polybasic acid with a polyfunctional amine. Generally, the fatty polyamides useful in the practice of the invention are those having an amine number of above about 9. The amine number is the number of milligrams of KOH equivalent to one gram of fatty polyamide and is determined by procedures well known in the art. The fatty polyamide sealants can be mixed with extenders, modifiers, and hardeners such as epoxy resins, in order to modify the physical properties of the fatty polyamide. In constructing flat cells in accord with the invention, the fatty polyamide sealant can be applied as a hot-melt or from solution in a solvent such as an alcohol/aromatic hydrocarbon mixture. Among the specific commercially available fatty polyamides that are particularly useful in constructing flat cells of the invention are those produced under the tradenames of VERSALON and GENBOND, General Mills, Inc. and Swift's Z—610, Swift and Company.

It has been found that during the assembly of flat cells of the invention the preferred adhesive sealants, i.e. fatty polyamides, do not readily wet some types of plastic film and accordingly a liquid tight seal between the cupped container and cover and the metal collector foils is sometimes difficult to attain. This difficulty may be overcome and the bond between the plastic film and the collector foils substantially improved if the plastic film is first subjected to successive heat and corona discharge treatments. The process for treating the plastic film is disclosed and claimed in our copending application Ser. No. 456,877, filed on Apr. 1, 1974. In this process, the plastic film is heated to an elevated temperature, about 120°C in the case of a polypropylene film, for a period of about one half minute, optionally cooling the plastic film to ambient temperature and then subjecting the film to a high intensity corona discharge in the area of the film where the collector foils are to be adhered.

It will be evident from the foregoing that the invention provides an improved flat alkaline cell construction of the type wherein the active cell elements are enclosed within a liquid impervious plastic film envelope. An important feature of the invention resides in the provision of both internal and external current collector members which are tightly sealed to the inner and outer sides, respectively, of one wall of the envelope, overlying an opening therein, through means of thin layers of an adhesive sealant which is non-wettable by the alkaline electrolyte. It will be noted in particular that the thin layers of adhesive sealant are preferably applied to substantially one entire face of both the internal and external collector members, tightly bonding the whole interface between the plastic film and the collector members and extending substantially the leakage path which is equivalent in length to approximately the length or width of one of the collector members. Since the alkaline electrolyte can only leak from the cell by penetrating the adhesive seal over this extended creepage path, there is little likelihood of leakage occuring from inside the cell.

Primary or secondary alkaline cell systems which are believed to be readily adaptable to the flat cell construction herein described include the following: nickel-cadmium, alkaline manganese dioxide-zinc, silver oxide-zinc, nickel-zinc, and mercuric oxide-zinc.

Electrodes and other materials employed would of course be those required by and compatible with the cell system employed. For example, the collector plates used with the alkaline manganese dioxide-zinc system would preferably be of copper or brass rather than steel. Similarly the flat electrodes employed could be of the well known pressed powder type on an open or expanded conductive substrate rather than of the impregnated porous sinter type.

It is obvious that the flat cell construction of the invention need not be limited to the rectangular format. Other shapes of cell such as square, circular, elliptical, hexagonal, and various irregular figures could be encased in plastic film and sealed by the technique herein disclosed.

Although not illustrated in the drawing, it is evident that certain variants in the flat cell construction are possible. For example, it would be within the scope of the invention to construct a thicker cell than that illustrated by encasing the cell in two opposed and sealed cupped assemblies rather than using the cup and cover assemblies illustrated. Similarly a thinner cell could be encased in two cover assemblies. Moreover, it is possible to construct two finished cells of the type illustrated juxtaposed with the cover ends joined to one another by a second heat seal securing together the flexible flange member surrounding each cell. A metal strip or tab may be brought out from between the two contacting collectors thereby facilitating connecting the two cells electrically in parallel. In this same two cell structure, one of the cells may be originally assembled internally with inverted polarity such that the final two cell assembly would be in series electrically. A center tab could again be brought out in the manner as described above to give an intermediate voltage. It will be evident from the foregoing that considerable flexibility exists in the manner of assembling cells and batteries of the invention.

One of the outstanding advantages of the flat cells of the invention, of course, is that the cells are ideally suited to the manufacture of high energy density batteries in which a minimum of space is devoted to cell package, connectors and the like. The plastic film envelope is capable of withstanding considerable pressure, yet will rupture without explosion if internal pressure becomes excessive. The cells may be made in odd shapes and sizes and combined in a variety of ways so that maximum flexibility exists in designing a high energy density battery to fit into various battery cavities as now found in present-day electronic devices and the like.

What is claimed is:

1. A flat alkaline cell comprising an electrode assembly including at least a pair of flat electrode elements of opposite polarity and a porous separator containing an alkaline electrolyte interposed between and in contact with the pair of electrode elements, said electrode assembly being enclosed within a sealed, liquid impervious plastic film envelope having an opening in one wall thereof, a flat internal current collector member disposed adjacent to the inner side of said wall and overlying said opening, a flat external current collector member disposed adjacent to the outer side of said wall and overlying said opening, said internal and external current collector members being tightly adhered to the inner and outer sides of said wall by means of thin layers of an adhesive sealant which is non-wettable by the alkaline electrolyte, said flat internal current collector being in electrical connection with one of said flat electrode elements and means for making electrical connection between said internal and external current collector members through said opening in said wall.

2. The flat alkaline cell as defined by claim 1, wherein the thin layers of said adhesive sealant are applied to substantially one entire face of each of said flat internal and external current collector members, tightly adhering said collector members to the inner and outer sides of said wall, respectively.

3. The flat alkaline cell as defined by claim 1, wherein said adhesive sealant comprises a fatty polyamide.

4. The flat alkaline cell as defined by claim 1, wherein said sealed envelope is made of a plastic film material selected from the group consisting of polyvinyl chloride, polyvinyl chloride copolymers, polypropylene and polyethylene.

5. The flat alkaline cell as defined by claim 1, wherein said electrode assembly includes at least one flat electrode element containing nickel hydroxide as the positive active material and at least one flat electrode element containing cadmium oxide or cadmium hydroxide as the negative active material.

6. The flat alkaline cell as defined by claim 1, wherein said electrode assembly includes at least one flat electrode element containing zinc as an active material and at least one flat electrode element containing an active material selected from the group consisting of manganese dioxide, silver oxide, mercuric oxide and nickel hydroxide.

7. The flat alkaline cell as defined by claim 1, wherein said sealed envelope comprises two plastic film wall members one of which is disposed over one end of said electrode assembly and the other of which is disposed over the opposite end of said electrode assembly, and wherein said opening is incorporated within at least one of said plastic film wall members, said plastic film wall members being sealed together along the marginal borders thereof to completely enclose the cell.

8. The flat alkaline cell as defined by claim 7 wherein one of said plastic film wall members is a cupped container in which said electrode assembly is placed and the other of said wall members is a cover, and wherein said opening is incorporated within at least one of said cupped container and cover, said cupped container and cover being sealed together along the marginal borders thereof to completely enclose the cell.

9. The flat alkaline cell as defined by claim 8, wherein the bottom wall of said cupped container has an opening therein and both internal and external foil current collector members are disposed adjacent to the inner and outer sides of said container overlying said opening and tightly adhered to said bottom wall by means of thin layers of said adhesive sealant and wherein means are provided for making electrical connection between said internal and external foil current collector members through said opening.

10. The flat alkaline cell as defined by claim 8, wherein said cover has an opening therein and both internal and external foil current collector members are disposed adjacent to the inner and outer sides of said cover overlying said opening and tightly adhered to said cover by means of thin layers of said adhesive sealant and wherein means are provided for making electrical connection between said internal and external foil current collector members through said opening.

11. A flat alkaline cell comprising a cupped container and a cover both of which are composed of a plastic film material, an electrode assembly disposed in said cupped container and including at least a pair of flat electrode elements of opposite polarity and a porous separator containing an alkaline electrolyte interposed between and in contact with the pair of electrode elements, said cupped container having an opening in the bottom wall thereof, a first internal foil current collector member disposed adjacent to the inner side of said bottom wall and a first external foil current collector member disposed adjacent to the outer side of said bottom wall, both said first internal and external current collector members overlying said opening in said bottom wall, said cover having an opening therein, a second internal foil current collector member disposed adjacent to the inner side of said cover and a second external foil current collector member disposed adjacent to the outer side of said cover, both said second internal and external current collector members overlying said opening in said cover, said first internal and external current collector members and said second internal and external current collector members being tightly adhered to the inner and outer sides of said bottom wall and said cover respectively by means of thin layers of an adhesive sealant which is non-wettable by the alkaline electrolyte, said first internal current collector member being in electrical connection with one of said flat electrode elements and said second internal current collector member being in electrical connection with another of said flat electrode elements of opposite polarity, and means for making electrical connection between said first internal and external current collector members through said opening in said bottom wall and between said second internal and external current collector members through said opening in said cover, said cupped container and cover being sealed together along the marginal border thereof to completely enclose the cell.

12. The flat alkaline cell as defined by claim 11, wherein the thin layers of said adhesive sealant are applied to substantially one entire face of each of said first and second internal and external foil current collector members, tightly adhering said collector members to the inner and outer sides of said bottom wall and cover, respectively.

13. The flat alkaline cell as defined by claim 11, wherein said adhesive sealant comprises a fatty polyamide.

14. The flat alkaline cell as defined by claim 11, wherein both said cupped container and cover are composed of a plastic film material selected from the group consisting of polyvinyl chloride, polyvinyl chloride copolymers, polypropylene and polyethylene.

15. The flat alkaline cell as defined by claim 1, wherein said electrode assembly includes at least one flat positive electrode element containing nickel hydroxide as the positve active material and at least one flat negative electrode element containing cadmium oxide or cadmium hydroxide as the negative active material.

16. The flat alkaline cell as defined by claim 15, wherein said electrode assembly includes at least a pair of said flat positive electrode elements and at least a pair of said flat negative electrode elements, one of said pair of negative electrode elements being interposed between said pair of positive electrode elements and one of said pair of positive electrode elements being interposed between said pair of negative electrode elements.

17. The flat alkaline cell as defined by claim 16, wherein said porous separator comprises an elongated strip of separator material enclosing one of said pair of flat negative electrode elements and having a free portion which is interposed between one of said pair of flat positive electrode elements and the other flat negative electrode element.

18. The flat alkaline cell as defined by claim 16, wherein a first elongated collector tab is affixed at one end to both of said pair of flat positive electrode elements and is positioned at its other end in electrical connection with one of said first or second internal foil current collector members.

19. The flat alkaline cell as defined by claim 18, wherein a second elongated collector tab is affixed at one end to both of said pair of flat negative electrode elements and is positioned at its other end in electrical connection with the other of said first or second internal foil current collector members.

20. The flat alkaline cell as defined by claim 16, wherein the capacity of said flat negative electrode elements is at least one and one-half times greater than the capacity of said flat positive electrode elements.

21. The flat alkaline cell as defined by claim 11, wherein said means for making electrical connection between said first internal and external current collector member and said second internal and external current collector members is a spot weld.

22. The method of assembling a flat alkaline cell including an electrode assembly comprising at least a pair of flat electrode elements of opposite polarity and a porous separator containing an alkaline electrolyte interposed therebetween, said method comprising the steps of providing at least two plastic film wall members for forming a sealed envelope for said cell, at least one of said wall members having an opening therein, placing a flat internal and a flat external current collector adjacent to the inner and outer sides of said one wall member overlying said opening therein, applying a thin layer of adhesive sealant which is non-wettable by the alkaline electrolyte on the surface of at least one of said internal and external current collectors and said one wall member, tightly adhering said current collectors to the respective inner and outer sides of said one wall member by means of said thin layer of adhesive sealant, electrically connecting said internal and external current collectors through said opening in said one wall member, placing the so-formed composite collector-wall member adjacent to one end of said electrode assembly with said internal current collector making electrical connection with one of said flat electrode elements, and then completing the assembly of said sealed envelope by placing the other of said wall members adjacent to the other end of said electrode assembly and then sealing together the marginal borders of said wall members.

23. The method of assembling a flat alkaline cell as defined by claim 22, wherein the thin layer of adhesive sealant is applied to substantially the entire surface of each of said flat internal and external current collectors, tightly adhering said collectors to the inner and outer sides of said wall member.

24. The method of assembling a flat alkaline cell as defined by claim 22, wherein said adhesive sealant comprises a fatty polyamide.

25. The method of assembling a flat alkaline cell as defined by claim 22, wherein said wall members are made of a plastic film material selected from the group consisting of polyvinyl chloride, polyvinyl chloride copolymers, polypropylene and polyethylene.

26. The method of assemblig a flat alkaline cell as defined by claim 22, wherein flat internal and flat external current collectors are tightly adhered to the inner and outer sides of both of said plastic film wall members by thin layers of said adhesive sealant forming two composite collector-wall members and wherein said sealed envelope is completed by sealing together the marginal borders of said composite collector-wall members.

27. The method of assembling a flat alkaline cell as defined by claim 26, wherein one of said composite collector-wall members is a cupped container in which said electrode assembly is placed and wherein the other of said composite collector-wall members is a cover.

28. The method of assembling a flat alkaline cell as defined by claim 27, wherein a first collector tab is affixed at one end to one of said pair of flat electrode elements and is positioned at its other end in electrical connection with the internal collector of the composite collector-wall member forming said cupped container.

29. The method of assembling a flat alkaline cell as defined by claim 28, wherein a second collector tab is affixed at one end to the other of said pair of flat electrode elements and is positioned at its other end in electrical connection with the internal collector of the collector-wall member forming said cover.

* * * * *